July 20, 1965 W. A. SHURCLIFF Re. 25,821

RADIATION DETECTION DEVICES

Original Filed May 13, 1952

William A. Shurcliff
INVENTOR

BY Brown and Mikulka and Gerald Altman
ATTORNEYS

United States Patent Office

Re. 25,821
Reissued July 20, 1965

25,821
RADIATION DETECTION DEVICES

William A. Shurcliff, Cambridge, Mass., assignor to Polaroid Corporation, Cambridge, Mass., a corporation of Delaware Original No. 2,730,625, dated Jan. 10, 1956, Ser. No. 287,535, May 13, 1952. Application for reissue June 5, 1956, Ser. No. 589,361
7 Claims. (Cl. 250—71)

Matter enclosed in heavy brackets [ ] appears in the original patent but forms no part of this reissue specification; matter printed in italics indicates the additions made by reissue.

This invention relates to detection and more particularly to devices, commonly known as dosimeters, for detecting and measuring penetrative radiation of the kind emanating from radioactive or fissionable materials.

An object of the present invention is to provide a dosimeter for detecting and measuring penetrative radiation, said dosimeter being provided with a detecting element which, after having been subjected to a predetermined quantity of penetrative radiation, is adapted to emit fluorescent light of an intensity functionally related to said quantity when excited by a predetermined quality and intensity of additional radiation.

Other objects of the present invention are: to provide a dosimeter of the above type wherein the detecting element is composed of silver phosphate glass; to provide, in combination with such a dosimeter, reading apparatus for exciting a detecting element of the aforementioned type and for measuring the intensity of fluorescent light emanating from a face of said detecting element; to provide a dosimeter of the above type comprising a base mounting a detecting element, and means for predeterminedly positioning said base with respect to said reading device; to provide a dosimeter of the above type having a base which forms with a cooperating cover member a weather-tight, lighttight casing, the geometrical dimensions of which are of the same order of magnitude as are those of the detecting element; and to provide a compact dosimeter comprising a casing of the above type, the cover member of which may be opened and closed readily to permit repeated reading of the detecting element.

Other objects of the invention will in part be obvious and will in part appear hereinatfer.

The invention accordingly comprises the product possessing the features, properties and the relation of components, and the apparatus possessing the construction, combination of elements and arrangement of parts which are exemplified in the following detailed disclosure, and the scope of the application of which will be indicated in the claim.

For a fuller understanding of the nature and objects of the invention, reference should be had to the following detailed description taken in connection with the accompanying drawing wherein.

A dosimeter embodying the invention herein disclosed includes a detecting element which, after being subjected to a quantity of penetrative radiation, has the property of emitting fluorescent light of an intensity functionally related to said quantity when excited by a predetermined quality and intensity of additional radiation. One example of a material of which such a detecting element may be composed is sliver phosphate glass. After silver phosphate glass has received a dose of gamma radiation, it has the property of emitting orange fluorescent light upon being excited by near ultraviolet radiation. The intensity of this fluorescent light is substantially proportional to the dose of gamma radiation. The dosimeter is so constructed that the detecting element is normally confined within a watertight casing formed by a base and a cover. When the cover is removed two faces of the detecting element are exposed so that one exposed face may be excited with ultraviolet radiation and the other exposed face may emit fluorescent light, the intensity of which may be readily measured.

Figure 1:
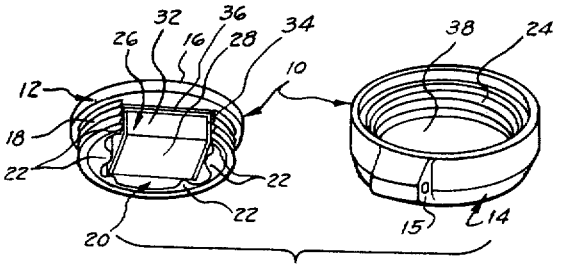
FIGURE 1 is a partially exaggerated, perspective view of a dosimeter embodying the present invention with the components thereof unassembled.
Figure 2:
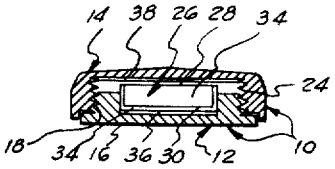
FIG. 2 is a cross-sectional view of the dosimeter of FIG. 1 with the components thereof assembled.

Referring now to the drawings, wherein like numerals denote like parts, FIGS. 1 and 2 disclose a dosimeter embodying the present invention. As a means for mounting and enclosing the components of the illustrated dosimeter, a casing 10 which includes a mounting means or base 12 and a closure means or cover 14 is provided. Base 12 and cover 14 preferably are composed of a material, such as an organic plastic, which does not appreciably attenuate radiation passing therethrough. Cover 14 is provided with a suitable securing means 15 by virtue of which casing 10 may be attached to the clothing of a wearer.

As shown, base 12 includes a head portion 16 and a peripherally threaded shank portion 18. Shank portion 18 is cut out to provide a space 20 extending from its central section through a section of its periphery. Projecting from shank portion 18 into space 20 are a plurality of lugs 22 which are adapted to predeterminedly orient a detecting element within space 20.

Cover 14 is provided with an internally threaded opening 24 which is adapted to receive threaded shank portion 18. Base 12, when threaded into cover 14, forms with cover 14 an easily opened and closed, lighttight, weathertight casing, the overall size of which may be of the same order of magnitude as that of a detecting element positioned therewithin. A suitable gasket may be positioned between abuting portions of base 12 and cover 14.

In the illustrated embodiment, the detecting element comprises a phosphate glass parallelepiped 26 having a front face 28, a rear face 30 and four edge faces 32. Front and rear faces 28 and 30 may be polished or, alternatively, may be rough ground to produce for example what is known in the art as a 120 grit finish. Edge faces 32 may be polished or, alternatively, may be clean-cut by means of a conventional glass cutter. Element 26 is suitably secured within space 20 in such a manner that front face 28 and one edge face 32 are exposed. This construction and arrangement is such that if element 26 has received a dose of gamma radiation, when face 28 is illuminated with a predetermined intensity of ultraviolet radiation, fluorescent light predominantly in the orange range of the spectrum, and of an intensity functionally related to the dose, emanates from exposed edge face 32.

An illustration of the composition by weight of a preferred detecting element is as follows: approximately 50 parts by weight of aluminum phosphate ($Al(PO_3)_3$); approximately 25 parts by weight of potassium phosphate ($KPO_3$); approximately 25 parts by weight of barium phosphate ($Ba(PO_3)_2$); approximately 8 parts by weight of silver phosphate ($Ag(PO_3)$), preferably, the meta compound.

Excitation of element 26 with ultraviolet radiation produces within element 26 fluorescent light of a given intensity, part of which emanates from exposed edge face 32. In the absence of preventative measures, such excitation further produces extraneous fluorescent light in the immediate environment of element 26 which passes through element 26 so as to cause the total intensity of fluorescent light emanating from exposed edge face 32 to be greater than this given intensity. In order to prevent such extraneous radiation from passing through element 26, all faces of element 26, excepting front face 28 and exposed edge face 32, are provided with a black coating 34 which is adapted to absorb extraneous fluorescent light. Coating 34 further serves to eliminate an additional source of error, namely, unpredictable reflection of fluorescent light within element 26. By way of example, coating 34 may comprise a black paint or enamel.

It has been found that the energy (measured in million-electron-volts), as well as the dose or quantity of penetrative radiation, received by detecting element 26 has an effect on the intensity of fluorescent light emitted from exposed face 32. As a means for eliminating such "energy dependence," suitable radiation-attenuating shields may be provided through which penetrative radiation must pass in order to reach element 26. It has been found, for example, that lead shields .06 mm. in thickness substantially eliminate energy dependence in the range of .05 to 5.0 million-electron-volts. In the illustrated embodiment two lead shields of the aforementioned type are secured to casing 10 adjacent front and rear faces 28 and 30 of element 26. Thus base 12 is provided with a shield 36, square in shape, and substantially coextensive with face 30. Secured to cover 14 is shield 38 that is positioned parallel to and adjacent face 28 when base 12 and cover 14 are threaded together. As shown, shield 38 is circular in shape and is sufficiently large to be coextensive with face 28 irrespective of the position which it assumes when base 12 and cover 14 are threaded together.

Figure 3:
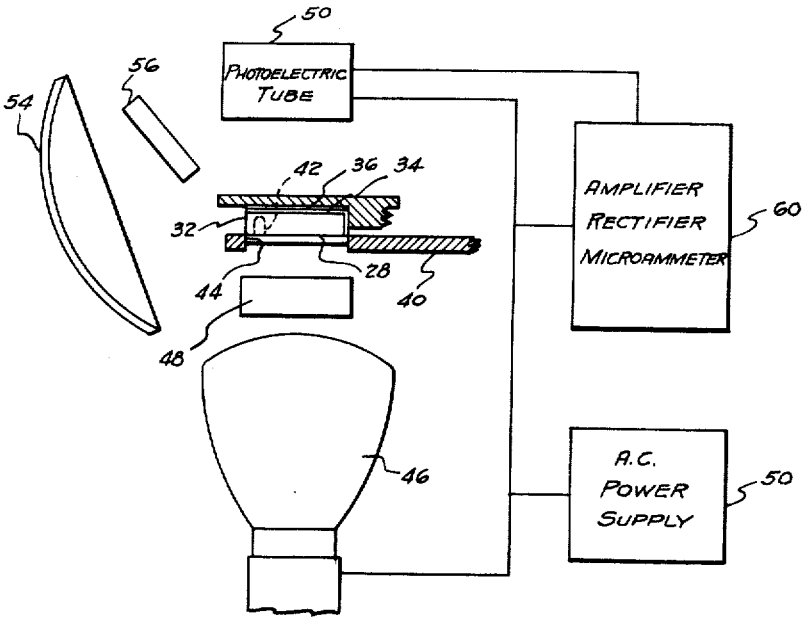
FIG. 3 illustrates diagrammatically a reading device for measuring the quantity, in roentgens, of penetrative radiation to which the dosimeter of FIGS. 1 and 2 has been subjected.

In accordance with the present invention there is provided a reading device for measuring the dose of penetrative radiation received by the above-described dosimeter. A mounting means is provided for predeterminedly orienting base 12 with respect to the remainder of the reading device. The mounting means, in the form shown, comprises a member 40 provided with a pair of pins 42 (one of which is shown in dotted lines in FIG. 3), each of which is adapted to be inserted between a pair of lugs 22 of shank portion 18. Member 40 is provided with an opening 44 which is aligned with face 28 of detecting element 26 when pins 42 are properly inserted between the pairs of lugs 22 associated therewith.

A suitable source 46 of ultraviolet radiation is provided. In the form shown, viewing FIG. 3, source 46 is positioned below member 40 in alignment with opening 44 so as to be adapted to illuminate face 28 of detecting element 26. Since the intensity and character of fluorescent light that emanates from edge face 32 is determined by the character of radiation striking face 28, it is desirable to illuminate face 28 only with ultraviolet radiation of predetermined intensity and quality so that fluorescent light emanating from edge face 32 will be precisely related to the dose of radiation received by detecting element 26. Accordingly, there is positioned between source 46 and opening 44 a suitable filter 48 which absorbs all radiation except ultraviolet radiation within a predetermined frequency range.

Forming part of a means for measuring the intensity of fluorescent light emanating from edge face 32 is a photoelectric tube, designated herein by 50. Fluorescent light emanating from exposed edge face 32 is reflected by a mirror 54 through a filter 56 toward the photoelectric tube. Mirror 54 is suitably curved to present a large solid angle so that manufacturing tolerances among the relative positions of the mirror, the photoelectric tube and exposed face 32 do not appreciably affect the intensity of fluorescent light incident upon photoelectric tube 50. Filter 56 is adapted to absorb all radiation passing therethrough except orange light within a desired predetermined frequency range, which light bears a desired functional relationship to the dose of gamma radiation received by detecting element 26.

In the illustrated embodiment, an alternating current power supply 58 is provided to produce in source 46 pulsating ultraviolet radiation. Pulsating radiation from source 46 causes pulsating fluorescent light to emanate from exposed edge face 32 and to generate an alternating current signal at the output of photoelectric tube 50. For evaluating this alternating current signal, there is provided, as is illustrated at 60, an amplifier for bringing the signal impressed thereon to a useful decibel level, a rectifier for converting the alternating current signal to a direct current signal, and a microammeter for providing a visual indicating of the intensity of the direct current signal. The microammeter, if desired, may be calibrated in roentgens so as to indicate directly the dose of gamma radiation received by detecting element 26. Photoelectric tube 50 and amplifier, rectifier and microammeter 60, may be energized by power supply 58 in a conventional manner.

In operation, casing 10 is assembled by threading cover 14 onto base 12 and is attached to the clothing of a wearer, as by securing means 15, until it is desired to evaluate the dose received by element 26. Cover 14 is unthreaded and base 12 mounted on member 40 with pins 42 inserted between the pairs of lugs 22 associated therewith. Now photoelectric tube 50 and amplifier, rectifier and microammeter 60 may be energized and the dose received by detecting element 26 measured.

It is expressly to be understood that the principles herein disclosed may be applied to dosimeters having detecting elements composed of materials other than phosphate glass.

Since certain changes may be made in the above product and apparatus without departing from the scope of the invention herein involved, it is intended that all matter contained in the above description or shown in the accompanying drawing shall be interpreted as illustrative and not in a limiting sense.

What is claimed is:

1. Detecting apparatus comprising a base, a cover capable of forming with said base a casing, said base and said cover being composed of a material which is adapted to transmit penetrative radiation without appreciable attenuation, a phosphate glass detecting element mounted on said base, said element, after having received a dose of penetrative radiation, being adapted to emit from one face thereof fluorescent light of an intensity functionally related to said dose when exciting radiation of predetermined quality and intensity is incident upon another face thereof, said other face being substantially at right angles to said one face, and reading apparatus for measuring said dose, said reading apparatus comprising a mounting means, means for predeterminedly orienting said base with respect to said mounting means, a source of ultraviolet radiation in alignment with said one face, a photoelectric tube, a curved mirror positioned with respect to said other face and said photoelectric tube so as to reflect fluorescent light emanating from said other face toward said photoelectric tube and electrical means for measuring the signal produced by said photoelectric tube as a result of fluorescent light incident thereupon.

2. A dosimeter comprising a base, a cover, said base having a head portion and a shank portion, the periphery of said shank portion being externally threaded, said shank portion being connected to said head portion at one of its ends and being free at the other of its ends, said cover having an internally threaded opening therein, said shank portion having a cut-out space extending from its central section through a section of its periphery and through its free end, and a phosphate glass detecting element secured in said cut-out space so that at least two of its faces are exposed, said shank portion being threaded into said opening.]

[3. A dosimeter comprising a base and a cover, said base having a head and a peripherally threaded shank, one end of said shank being connected to said head and the other end of said shank being free, said shank having a cut-out space extending from its central section through a section of its periphery and through a section of its free end, and a phosphate glass parallelepiped secured in said cut-out space so that ultraviolet radiation may pass through said section of said free end to one face of said parallelepiped and so that fluorescent light may emanate from another face of said parallelepiped through said section of said periphery, said cover having an internally threaded opening, said shank being threaded into said opening in order to form with said cover a weather-tight casing for said parallelepiped.]

[4. A dosimeter comprising a base, said base having a head portion and a shank portion having a threaded periphery, one end of said shank portion being connected to said head portion and the other end of said shank portion being free, said shank portion having a cut-out space extending from its central section through a section of said periphery and through a section of said other end, and a phosphate glass parallelepiped detecting element mounted in said cut-out space, said element having one face aligned with said section of said periphery and another face aligned with said section of said other end, said one face being perpendicular to said other face, whereby ultraviolet radiation may pass through said section of said other end and through said other face and so that fluorescent light emanating from said one face may pass through said section of said periphery.]

5. Apparatus for detecting and measuring gamma radiation, said apparatus comprising a dosimeter including a base, said base having a head portion and a shank portion, said shank portion being externally threaded, said shank portion being connected at one of its ends to said head portion and being free at the other of its ends, said shank portion having a cut-out space extending from its central section through a section of its periphery and through its free end, and a phosphate glass detecting element mounted in said cut-out space with one face thereof exposed through said free end and another face thereof, at right angles to said first face, exposed through said section of said periphery, said element, after having received a dose of penetrative radiation, being adapted to emit from said other face fluorescent light of an intensity functionally related to said dose when ultraviolet light of predetermined intensity is incident upon said one face, said shank portion being adapted to be threaded into said opening, and reading apparatus for measuring said dose, said reading apparatus comprising a mounting means, means for predeterminedly orienting said base with respect to said mounting means, a source of ultraviolet radiation for illuminating said one face, a photoelectric tube, a curved mirror positioned with respect to said other face and said photoelectric tube so as to reflect fluorescent light emanating from said other face toward said photoelectric tube and electrical means for measuring the signal produced by said photoelectric tube as a result of fluorescent light incident thereupon.

6. Detecting apparatus comprising a base, a cover capable of forming with said base a casing, said base and said cover being composed of a material which is adapted to transmit penetrative radiation without appreciable attenuation, a detecting element mounted on said base, said element, after having received a dose of penetrative radiation, being adapted to emit from one face thereof fluorescent light of an intensity functionally related to said dose when exciting radiation of predetermined quality and intensity is incident upon another face thereof, said other face being substantially at right angles to said one face, and reading apparatus for measuring said dose, said reading apparatus comprising a mounting means, means for predeterminedly orienting said base with respect to said mounting means, a source of exciting radiation in alignment with said one face, a photoelectric tube, a mirror positioned with respect to said other face and said photoelectric tube so as to reflect fluorescent light emanating from said other face toward said photoelectric tube, and electrical means for measuring the signal produced by said photoelectric tube as the result of fluorescent light incident thereupon.

7. Detecting apparatus comprising a base, a cover capable of forming with said base a casing, said base and said cover being composed of a material which is adapted to transmit penetrative radiation without appreciable attenuation, a detecting element mounted on said base, said element, after having received a dose of penetrative radiation, being adapted to emit from one face thereof fluorescent light of an intensity functionally related to said dose when exciting radiation of predetermined quality and intensity is incident upon another face thereof, said other face being substantially at right angles to said one face, the remaining faces of said detecting element having a black coating, and reading apparatus for measuring said dose, said reading apparatus comprising a mounting means, means for predeterminedly orienting said base with respect to said mounting means, a source of exciting radiation in alignment with said one face, a photoelectric tube, a curved mirror positioned with respect to said other face and said photoelectric tube so as to reflect fluorescent light emanating from said face toward said photoelectric tube, and electrical means for measuring the signal produced by said photoelectric tube as a result of fluorescent light incident thereupon.

[8. A dosimeter comprising a base, said base including a head portion and a shank portion having a threaded periphery, one end of said shank portion being connected to said head portion and the other end of said shank portion being free, said shank portion having a cut-out space extending from its central section through a section of said periphery and through a section of said other end, and a parallelepiped detecting element mounted in said cut-out space, said element having one face exposed at said section of said periphery and another face exposed at said section of said other end, said one face being perpendicular to said other face whereby exciting radiation may pass through said section of said other end and said other face and whereby fluorescent light emanating from said one face may pass through said section of said periphery.]

[9. A dosimeter comprising a base, said base including a head portion and a shank porting having a threaded periphery, one end of said shank portion being connected to said head portion and the other end of said shank portion being free, said shank portion having a cut-out space extending from its central section through a section of said periphery and through a section of said other end, and a parallelpiped detecting element mounted in said cut-out space, said element having one face exposed at said section of said periphery and another face exposed at said section of said other end, a black coating on the remaining faces of said element, said one face being perpendicular to said other face whereby exciting radiation may pass through said section of said other end and through said other face and whereby fluorescent light emanating from said one face may pass through said section of said periphery.].

10. Apparatus for detecting and measuring gamma radiation, said apparatus comprising a dosimeter including a base, said base having a head portion and a shank portion, said shank portion being externally threaded, said shank portion being connected at one of its ends to said head portion and being free at the other of its ends, said shank portion having a cut-out space extending from its central section through a section of its periphery and through its free end, and a detecting element mounted in said cut-out space with one face thereof exposed at said free end and another thereof, at right angles to said one face, exposed at said section of said periphery, said element, after having received a dose of penetrative radiation, being adapted to emit, from said other face, fluorescent light of an intensity functionally related to said dose, when exciting radiation of predetermined intensity is incident upon said one face, said shank portion being adapted to be threaded into said opening, and reading apparatus for measuring said dose, said reading apparatus comprising a mounting means, means for predeterminedly mounting said base on said mounting means, a source of exciting radiation oriented toward said one face, a photoelectric tube, a mirror oriented between said other face and said photoelectric tube so as to reflect fluorescent light emanating from said other face toward said photoelectric tube, and electrical means for measuring the signal produced by said photoelectric tube as a result of fluorescent light incident thereupon.

11. Apparatus for measuring gamma radiation, said apparatus comprising a dosimeter including a base, said base having a head portion and a shank portion, said shank portion being externally threaded, said shank portion being connected at one of its ends to said head portion and being free at the other of its ends, said shank portion having a cut-out space extending from its central section through a section of it periphery and through its free end, and a detecting element mounted in said cut-out space with one face thereof exposed at said free end and another face thereof, at right angles to said one face, exposed at said section of said periphery, the remaining faces of said element having a black coating, said element, after having received a dose of penetrative radiation, being adapted to emit, from said other face, fluorescent light of an intensity functionally related to said dose, when exciting radiation of predetermined intensity is incident upon said one face, said shank portion being adapted to be threaded into said opening, and reading apparatus for measuring said dose, said reading apparatus comprising a mounting means, means for predeterminedly mounting said base on said mounting means, a source of exciting radiation oriented toward said one face, a photoelectric tube, a curved mirror the axis of which is oriented between said other face and said photoelectric tube so as to reflect fluorescent light emanating from said other face toward said photoelectric tube, and electrical means for measuring the signal produced by said photoelectric tube as a result of fluorescent light incident thereupon.

12. Apparatus for detecting and measuring gamma radiation, said apparatus comprising a dosimeter including a base, said base having a head portion and a shank portion, said shank portion being externally threaded, said shank portion being connected at one of its ends to said head portion and being free at the other of its ends, said shank portion having a cut-out space extending from its central section through a section of its periphery and through its free end, and a phosphate glass-detecting element mounted in said cut-out space with one face thereof exposed through said free end and another face thereof, at right angles to said one face, exposed at said section of said periphery, the remaining faces of said element having a black coating, said element, after having received a dose of penetrative radiation, being adapted to emit, from said other face, fluorescent light of an intensity functionally related to said dose, when ultraviolet light of predetermined intensity is incident upon said one face, said shank portion being adapted to be threaded into said opening, and reading apparatus for measuring said dose, said reading apparatus comprising a mounting means, means for predeterminedly positioning said base on said mounting means, a source of ultraviolet radiation oriented toward said one face, a photoelectric tube, a curved mirror the axis of which is oriented between said other face and said photoelectric tube so as to reflect fluorescent light emanating from said other face toward said photoelectric tube, and electrical means for measuring the signal produced by said photoelectric tube as a result of fluorescent light incident thereupon.

References Cited by the Examiner

The following references, cited by the Examiner, are of record in the patented file of this patent or the original patent.

UNITED STATES PATENTS

| | | |
|---|---|---|
| 1,576,535 | 3/26 | Muir. |
| 2,435,843 | 2/48 | Rand. |
| 2,524,839 | 10/50 | Schulman et al. |
| 2,539,196 | 1/51 | Marshall. |
| 2,559,219 | 7/51 | Ludeman. |
| 2,585,551 | 2/52 | Hofstadter. |

OTHER REFERENCES

The Scintillation Counter, Coltman, Pro. of the I.R.E., vol. 37, Jan.–June 1949, pp. 671–682.

RALPH G. NILSON, *Primary Examiner.*